July 8, 1969  A. L. MASTERS  3,453,685
POULTRY PICKING DRUM GUARD
Filed Nov. 9, 1966

INVENTOR.
ALLEN L. MASTERS
BY
ATTORNEYS

United States Patent Office 3,453,685
Patented July 8, 1969

3,453,685
POULTRY PICKING DRUM GUARD
Allen L. Masters, Ottumwa, Iowa, assignor to International Agri-Systems, Inc., Ottumwa, Iowa, a corporation of Iowa
Filed Nov. 9, 1966, Ser. No. 593,148
Int. Cl. A22c 21/02
U.S. Cl. 17—11.1                                         3 Claims

ABSTRACT OF THE DISCLOSURE

A poultry picking apparatus incorporating at least one elongated picking drum having a plurality of sets of axially spaced fingers extending therefrom. A guard structure extends from the frame of the apparatus and surrounds the effective picking surface of the drum axle to prevent birds being picked from coming into contact with the axle and being mutilated thereby.

---

This invention relates to a poultry picking apparatus and, more particularly, to a drum-type of picking apparatus incorporating novel guard means for insuring that the poultry will not be scraped, bruised or dismembered during travel through the picking apparatus.

In recent years, the field of poultry preparation has become highly automated. It is not, for example, uncommon to execute the entire defeathering, eviscerating, dismembering and packaging process by conveyor-line techniques. During the defeathering process, the birds are usually suspended by shackles which are attached to overhead conveyors. The birds are carried by the conveyor into varying types of picking machines where the feathers are wiped therefrom by any one of a large number of available arrangements of moving, flexible, picking devices. Usually, the picking machines comprise one or a plurality of sets of rotatable drums having the flexible picking fingers mounted thereon in radial fashion. Two such drums may be positioned so as to define therebetween a path for poultry travel. As the over-head conveyor assembly carries the birds along this path, they are contacted and wiped by the picking fingers which remove the feathers therefrom. The elongated picking drums may be arranged in any number of well-known fashions and may be utilized in conjunction with other types of picking equipment so as to insure efficient and effective plucking of the birds passing through the apparatus.

Elongated picking drum arrangements of the type described are advantageous in that they employ a relatively minimum number of moving parts to accomplish the plucking operation. This factor, of course, results in reduced purchase and maintenance costs to the packing concern. They have not proved entirely satisfactory, however, because they possess a marked tendency to scrape, bruise or dismember a relatively large percentage of the birds which are being passed therethrough. While these incidents are seemingly minor to those unfamiliar with the poultry packing business, they represent, in reality, sharp reductions in profit. These reductions are primarily a product of packing and grading standards. If, for example, a bird suffers a broken wing during the defeathering operation, the grading standards are such that it cannot then be sold as a prime consumer product.

The breaking, bruising and scraping of the poultry limbs and body is prompted primarily by a tendency of the picking drums to pull the bird out of the picking path and force it toward or into contact with either the rotating drum axle or the frame of the machine. In order to achieve satisfactory results, the flexible fingers, which extend radially from the drums, must be relatively long and, where two such drums are aligned in parallel fashion, the fingers usually intermesh within the path of poultry travel. This substantial length of the fingers permits the birds to work between them towards one of the rotating axles where they are contacted by relatively non-flexible sections of the picking fingers which tend to scrape or break sections of the bird.

It is an object of this invention to provide a poultry picking apparatus of the type described which is not subject to the disadvantages outlined above.

More particularly, it is an object of this invention to provide a drum-type picking apparatus incorporating means whereby the poultry being plucked will not tend to be forced toward and against the rotating axle of the drum and be subjected to bruising and breaking forces.

It is an object of this invention to provide an apparatus of the type described wherein the poultry being plucked will not tend to be forced between the drum and the frame of the machine where breaking and scraping often renders it unsuitable for packaging as a prime product.

It is an object of this invention to provide a picking apparatus employing a pair of aligned picking drums and a plurality of inter-related picking components employing a novel type of guard device which positively prevents the birds from being drawn into abutment with either the rotating drum axles or the machine frame and, thus, prevents their being dismembered, bruised and scraped thereby.

These and other objects of this invention will be clearly understood by reference to the following specification and accompanying figures in which.

Briefly, this invention comprises a frame within which is rotatably mounted an elongated axle-like member having a plurality of apertures in the periphery thereof adapted to receive conventional flexible picking fingers. The fingers are arranged on the axle member in circumferential sets such that the tips thereof trace a generally cylindrical pattern as the axle is rotated.

Between each circumferential set of flexible picking members is positioned a tubular guard device which preferably, encircles or passes around the main axle and has its ends affixed to the apparatus frame. The positioning of the guard members in the circumferential sets of flexible fingers is such that the birds being plucked will be allowed to be deviated from the vertical hanging position by the rotating fingers only to the extent that they contact the guard means. Since the guard means are stationary and have a relatively smooth surface configuration, the birds will not be scraped, bruised or broken by their abutment thereagainst.

In one embodiment of this invention, two such drums are placed in parallel relationship with adjacent section of their flexible fingers intermeshing so as to form a path through which the birds to be plucked pass. Beneath the path are positioned a plurality of cone-shaped finger supports which also carry flexible picking fingers. The cone-shaped supports are rotated in such a manner as to insure complete removal of the feathers from the poultry. The guard devices are shaped so as to allow optimum utilization of the rotating picking surfaces.

Figure 1:
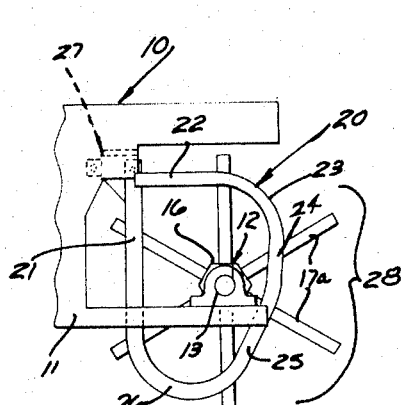
FIG. 1 is a fragmentary, side-elevational view of a drum-type picking apparatus embodying the novel guard device.
Figure 2:
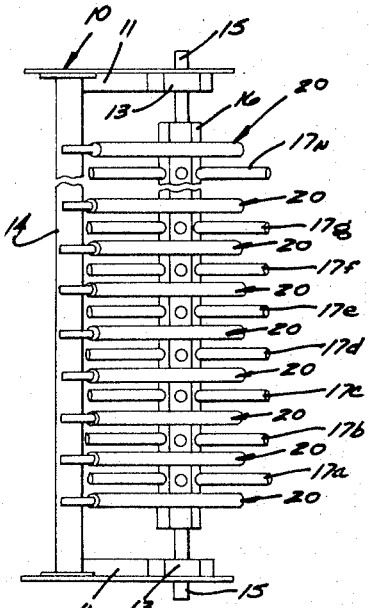
FIG. 2 is a fragmentary, broken plan view of the device shown in FIG. 1.

Referring now to the figures, a preferred embodiment of this invention will be described in detail. FIGS. 1 and 2 show a drum-type picking assembly having a frame 10 incorporating lateral arms 11 and one or more longitudinal bracing members 14. It will be readily understood by those skilled in the art that in actual usage, frame 10 would incorporate means to elevate the sections shown above the floor of the processing plant and for allowing it to be brought into working relationship with the conveyor assembly which carries the poultry to be plucked. Usually, devices such as shown in FIGS. 1 and 2 are utilized in pairs such that abutting sections of the picking drums define the path of travel through which the bird to be plucked passes.

The drum assembly 12 is rotatably mounted on lateral arms 11 by conventional pillow-block assemblies 13. Drum assembly 12 consists of a shaft 15 having an elongated hexagonal finger support 16 mounted thereon. Hexagonal finger support 16 has a plurality of sets of circumferentially aligned apertures therein adapted to receive flexible picking fingers 17 in a conventional manner. As viewed in FIG. 2, each of the circumferential sets 17a, 17b . . . 17n comprises six individual fingers which extend radially from finger support 16.

The guard assembly which forms the subject of this invention is indicated generally by the reference numeral 20. As shown in FIGS. 1 and 2, it comprises a vertical rear section 21, a horizontal top section 22, a curve top section 23, a vertical front section 24, a rearwardly slanted front section 25 and a curved bottom section 26 which closes on vertical rear section 21. The guard assemblies 20 are affixed to the frame of the machine by any suitable means. Conveniently, as shown at 27 in FIG. 1, vertical rear section 21 may extend upwardly beyond horizontal top section 22 a sufficient distance to be engaged by a suitable support clamp attached to frame 10. One of the guard assemblies 20 is positioned between each of the sets 17a through 17n of circumferentially aligned picking fingers. The guards preferably are tubular or circular in cross section so as to prevent any tendency to mark birds drawn thereagainst by the rotating fingers 17.

As shown in FIG. 1, the working section of the drum periphery 28 is relatively unobstructed by the guard assembly with the exception that sections 24 and 25 thereof pass around hexagonal finger supports 16. Ordinarily, picking drum assembly 12 is rotated clockwise as viewed in FIG. 1 by a suitable motor. As the bird to be picked is conveyed adjacent drum 12 and contacted by fingers 17, this clockwise rotation will tend to pull the ceiling suspended bird toward and into abutting relationship with hexagonal finger supports 16. This abutment, as pointed out previously, results in undesirable bruising and breaking of the bird body. The problem is aggravated by the fact that the relative flexibility of the fingers 17 decreases as their anchoring position on finger support 12 is approached. Thus, even if the bird does not come into contact with hexagonal finger supports 16 it may suffer abrasion damage by being constantly pulled across these rapidly rotating, relatively inflexible sections of the picking fingers by the conveying means. Finally, as will be appreciated further by those skilled in the art, the rotating fingers 17 additionally tend to drag the birds against any section (not shown) of the machine framework 10 lying adjacent the working portion 28 of the drum periphery so as to bruise or tear them. The presence of guard assemblies 20 positively prevents the birds from being pulled into contact with the rotating finger support 16 of the machine frame and, thus, prevents them from being broken or bruised thereby.

From FIG. 1, it will be noted that the curvature of guard assembly 20, specifically sections 23, 24 and 25 thereof, approximates to some extent the outer curvature of the cylinder defined by the tips of the rotating fingers. In operation, sections 23 and 24 allow the rear body portion of the bird to be drawn into the apparatus a sufficient distance to insure a thorough wiping of the feathers therefrom by the flexible fingers 17 but do not permit it to be drawn into the apparatus so far as to contact rotating finger support 16 and be mangled thereby. Similarly, section 25 permits the forward body sections, including the wings and neck, to be drawn between the rotating flexible fingers a sufficient distance to insure a thorough wiping of the feathers therefrom but not so far as to allow them to become entangled with or wrapped around finger support 16.

At first glance, it would appear that the tendency of the birds to be dragged into the axis of rotation of the drum could be prevented by placing the circumferential sets of fingers 17a through 17n longitudinally closer. Such positioning, however, does not afford a satisfactory solution to the problem since (1) the bird still tends to be forced into contact with the relatively stiff sections of the flexible fingers near the finger support and (2) the relative proximity of the flexible fingers prevents them from spreading over the bird when it is passing therebetween to wipe the feather from those sections of the body which are not caught in a direct downward stroke. The present device, on the other hand, allows the circumferential sets of fingers to be sufficiently spaced so as to afford optimum wiping conditions while positively preventing mangling of the birds by their coming into contact with the relatively stiff portions of the flexible fingers, the rotating finger support or the framework of the machine. Instead, as the bird is drawn toward the axis of rotation of the machine, it merely momentarily abuts the smooth stationary surface of one of the guard assemblies 20 until such time as it is pulled therefrom by the constantly moving over-head conveyor by which it is borne.

Figure 3:
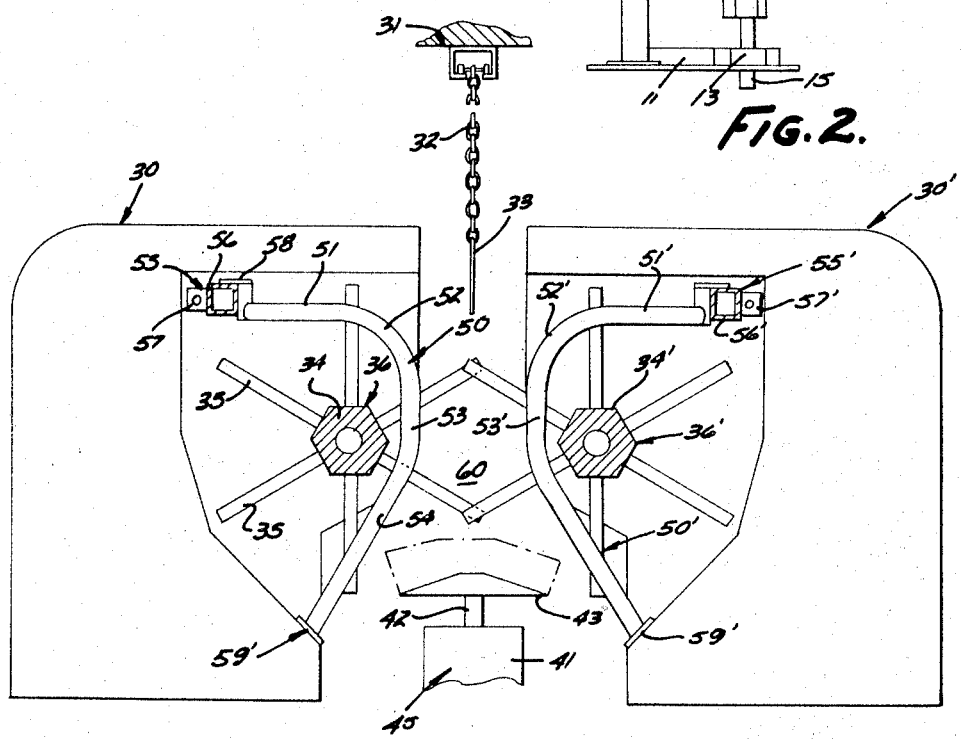
FIG. 3 is a fragmentary, side-elevational view, partially in cross section of an integrated picking apparatus incorporating a modified form of the novel guard structure.

Referring now to FIG. 3, there is shown a poultry picking apparatus similar to that disclosed in application Ser. No. 603,525, filed Dec. 21, 1966 and assigned to the same assignee as the present invention. The device comprises a left-hand drum carriage 30 and a right-hand drum carriage 30' which are positioned by suitable means (not shown) in operative relationship to an over-head conveyor assembly 31 having a plurality of chains 32 hanging therefrom to which are affixed shackles 33 adapted to retain the birds to be plucked by their legs. Each of the drum carriages 30 has a hexagonal finger support 34 rotatably borne therein. A plurality of circumferential sets of fingers 35 are positioned on the periphery of supports 34 in a manner identical to that disclosed in FIGS. 1 and 2.

Positioned between drum carriages 30 and 30' is an auxiliary picker assembly 40 comprising a frame 41, having a plurality of shafts 42 extending upwardly therefrom on which are mounted a plurality of cone-shaped finger supports 43. Cone-shaped finger supports 43 each carry a plurality of flexible picking fingers which have been omitted from the drawing for purposes of clarity. As noted above, the structural characteristics of the apparatus shown in FIG. 3 may be ascertained easily by reference to the pertinent co-pending application.

The device shown in FIG. 3 differs from that disclosed in the application Ser. No. 603,525, filed Dec. 21, 1966, in that it incorporates a plurality of guard assemblies 50, one of which is positioned between each circumferential set of picking fingers 35 in the manner indicated generally in FIG. 2. The guard assemblies 50 differ from the guard assemblies 20 shown in FIGS. 1 and 2 in that they do not close on themselves but, rather, are affixed directly to the machine frame at the upper and lower extremities thereof.

The guard assemblies 50 have a horizontal top section 51, a curve top section 52, a vertical front section 53 and a rearwardly slanted front section 54. The horizontal top sections 51 may be affixed to the frame as indicated at 55 by means of a box-iron support 56 which runs the entire length of the carriage 30 and is affixed to the sides thereof by suitable fastening means 57. A plurality of brackets 58 found each of the guard assemblies to the box-iron support 56. The rearwardly slanted front section 54 of the guard assemblies may be affixed to the frame as indicated at 59 by any conventional means such as a suitable retainer collar which may be welded directly to the frame.

The relative positioning of drum carriages 30 and 30' and the auxiliary picker assembly 40 is such that a path 60 is defined thereby through which the bird to be plucked is carried by conveyor 31. As will be noted by reference to FIG. 8 of the above noted co-pending application, the head and neck sections of the bird are drawn alternately to the right and to the left by the auxiliary picker assembly 40 into areas adjacent the rearwardly slanted front sections 54 of the picking drum assemblies 36 and 36' to insure that the upper and body and neck portions of the bird will be wiped completely clean of feathers. This constant repositioning of the bird upper body section against the lower part of the rotating drum assemblies 36 markedly exaggerates the tendency for the neck to be pulled either against structural members of carriage 30 or into abutment with hexagonal finger supports 34 resulting, as noted with regard to FIGS. 1 and 2, in bruising, breaking and scraping of the bird. The presence of guard assemblies 50 between each circumferential set of picking fingers 35 restricts the distance which the bird may travel toward the axis of rotation of the drum assemblies 36 and thus prevents their being bruised or broken by coming into contact with the machine framework or the rotating finger support. As was noted in FIGS. 1 and 2, guard assemblies 50 are preferably circular in cross section such that, when the birds abut thereagainst momentarily during their travel through the apparatus, there will be no tendency for bruising or breakage to occur.

It will be obvious to those skilled in the art that an unlimited number of varying configurations may be conceived for the guard assemblies 20 and 50. Primary designed criteria include but are not necessarily limited to (1) the positioning of a section of the rail between the axis of rotation of the drum and the path of bird travel in such a manner that the flexible working sections of the working fingers extend therebeyond while the inflexible sections are sealed thereby; (2) the avoidance of sharp bends adjacent the working sections of the drum upon which the birds might tend to catch as they pass thereby; and (3) the matching of the working area of the fingers extending beyond the guard assembly at any given point to the typical bird body section to be wiped free from feathers. Satisfactory results have been obtained by fabricating the guard assemblies from one-inch circular stock and spacing them longitudinally at two and three-quarter inch intervals along the machine. The latter dimension, of course, depends upon the spacing of the circumferential sets of picking fingers on the drum and assumes that they will also have two and three-quarter inch longitudinal spacings.

While a preferred embodiment of this invention and a modification thereof have been disclosed in detail, it will be readily appreciated by those skilled in the art that a vast number of other embodiments may be constructed without departing from the concepts as set forth herein.

I claim:

1. In a poultry picking apparatus for use in conjunction with an overhead conveyor which carries the poultry to be picked along a predetermined path, said apparatus having a frame; at least one elongated finger support mounted on said frame for rotation about an axis that lies outwardly and along said path; said elongated finger support having a plurality of sets of picking fingers affixed generally radially thereto for rotation therewith; a plurality of secondary finger supports mounted on said frame for rotation about axes oriented toward said path, said secondary finger supports having a plurality of picking fingers mounted thereon extending generally toward said path; the improvement comprising: guard means affixed to said frame and passing around said elongated finger support, one of said guard means extending between each of said sets, each of said guard means including a generally vertical front section positioned in relatively close proximity to said elongated support and an inwardly extending lower section extending beneath said elongated support, said sections preventing poultry being picked from contacting said elongated support and being barked or otherwise mutilated thereby and retaining said bird in picking contact with the fingers on said secondary supports as said bird is conveyed through said apparatus.

2. The apparatus as set forth in claim 1 which further comprises a second elongated finger support mounted on said frame for rotation about an axis that lies outwardly and along said path, said second elongated support being positioned on the opposite side of said path from said one elongated support, said second elongated support having a plurality of second sets of picking fingers affixed generally radially thereto for rotation therewith, one of said guard means being positioned between each of said second sets.

3. The apparatus as set forth in claim 1 wherein said guard means have a smoothly curved cross-sectional shape.

References Cited

UNITED STATES PATENTS

| 2,543,372 | 2/1951 | Mueller | 17—11.1 |
| 3,203,035 | 8/1965 | De Long | 17—11.1 |

FOREIGN PATENTS

| 1,028,345 | 2/1953 | France. |

LUCIE H. LAUDENSLAGER, *Primary Examiner.*